Patented Aug. 11, 1953

2,648,663

UNITED STATES PATENT OFFICE 2,648,663

PREPARATION OF 17α-HYDROXY STEROIDS

Percy L. Julian, Maywood, and Edwin W. Meyer and Isabelle Ryden, Chicago, Ill., assignors to The Glidden Company, Cleveland, Ohio, a corporation of Ohio No Drawing. Application August 4, 1949, Serial No. 108,658

23 Claims. (Cl. 260—239.55)

The present invention relates to the production of 17α-hydroxy-20-keto compounds in the steroid series.

Many of the cortical hormones possess a 17α-hydroxy group. These hormones have been isolated in small quantities by tedious and expensive extraction and purification methods from adrenal cortices. Synthetic methods for introducing the 17α-hydroxy group into steroid materials obtainable from other material sources have been proposed, Fuchs and Reichstein, Helv. Chem. Acta 24, 804, (1941); Hegner and Reichstein, Helv. Chem. Acta. 24, 828, 1941; Sarett, J. Biol. Chem. 162, 601, 1946; Sarett J. A. C. S. 70, 1454, (1948); but such methods as have been proposed are at best exceedingly involved and expensive.

It appeared that reduction of 16,17-oxido-pregnene and pregnane compounds might lead to the introduction of the 17α-hydroxy group. However, the usual reducing treatments were found to be unsuitable. It was then found that the reduction could be effectuated by the use of lithium aluminum hydride. Reduction of 16,17-oxido-20-keto pregnenes and pregnanes with lithium aluminum hydride was found to yield the 17α-hydroxy-20-hydroxy compounds as a mixture of the C-20 epimers. Since all of the adrenal cortical hormones contain a 3-keto group and most of them contain a 20-keto group, any preparation beginning with 3,17,20-tri-hydroxy compounds must involve an oxidation of such compounds. Such an oxidation involves extensive cleavage at the $C_{17}$—$C_{20}$ bond, producing compounds related to adrenosterone. Thus, for example, Sarett, J. Biol. Chem., 162, 601 (1946), could obtain only an 18% yield of Kendall's Compound E on oxidation of Reichstein's Compound U-21-monoacetate with chromic acid. Moreover, even if the 20-keto group is present as such during the oxidation of an hydroxyl group at another position in the molecule of a 17-hydroxy steroid, the preparation becomes impractical, either because of cleavage at $C_{17}$—$C_{20}$ with reagents like chromic acid, or rearrangement of Ring D to a D-homosteroid with reagents of the Oppenauer oxidation type. It therefore becomes essential to protect the $C_{20}$-keto group during such transformations in a way that allows its ready regeneration when such transformations have been effected.

It also follows from the above that it is essential to avoid transformation of the 20-keto group into a secondary alcohol group during any vigorous reduction such as that of the 16,17-oxido group.

It is accordingly an object of the present invention to provide a process for preparing 17α-hydroxy-20-keto-compounds of the pregnane and pregnene series.

A further object is to provide a method for converting 16,17-oxido-20-keto pregnenes and pregnanes to 17α-hydroxy-20-keto-pregnenes and pregnanes.

An additional object is to provide a method for protecting the 20-keto group during the reduction of 16,17-oxido-20-keto pregnenes and pregnanes with lithium aluminum hydride.

Another object is to produce new steroid compounds useful in the introduction of a 17α-hydroxy group in the pregnenes and pregnanes and in the production of 17α-hydroxy-20-keto steroids.

Other objects will be apparent from the following description of the invention.

It has been found that the foregoing objects can be realized by protection of the 20-keto group of the 16,17-oxido-compounds during the reduction through the formation of a cyclic ketal. It has been found that these 16,17-oxido-20-ketals undergo smooth reduction with lithium aluminum hydride and that the resulting products are readily cleaved to the 17α-ol-20-ones.

The following examples are illustrative:

EXAMPLE 1

*Preparation of 16,17-oxido-5-pregnene-3β-ol-20-one acetate*

A solution of 3.54 grams of $\Delta^{5,16}$-pregnadiene-3β-ol-20-one acetate in 20 ml. of $CHCl_3$ was treated at ice bath temperature with a solution of 1.60 g. of bromine in 16 ml. of $CHCl_3$. The chloroform solution was then washed with water, 2% NaOH, water and dried. It was then concentrated in vacuo to a white crystalline solid. This solid was dissolved in 50 ml. of benzene and treated with 50 ml. of a benzene solution containing 56 mg. of perbenzoic acid per ml. After standing in the dark room at room temperature for 24 hours, the benzene solution was washed with 2% NaOH solution and water. The dried solution was concentrated to a white crystalline solid which was debrominated with zinc dust in ether-acetic acid solution. The ether solution was separated from zinc, washed with water, dilute sodium bicarbonate solution, water and dried. After concentration, the product, $\Delta^5$-16,17-oxido-pregnene-3β-ol-20-one acetate, was crystallized from methanol; 1.66 g., M. P. 152–155° C.

EXAMPLE 2

*The preparation of the ketal of 16,17-oxido-5-pregnene-3β-ol-20-one acetate*

A mixture of 744 mg. of the oxido compound of Example 1 and 744 mg. of ethylene glycol in 42 ml. of benzene was boiled in a flask connected to a modified Bidwell-Sterling moisture separator. After the residual moisture had separated from the reaction mixture, 50 mg. of p-toluenesulfonic acid monohydrate was added and boiling continued for three hours. The mixture was diluted with water and extracted with ether. The ether solution was washed with dilute sodium carbonate solution, water and dried. After addition of several drops of pyridine, the solvent was removed in vacuo and the solid residue crystallized from methanol. There resulted 400 mg. of white needles of the ethylene glycol ketal of 16,17-oxido-5-pregnene-3β-ol-20-one acetate. The purified material (crystallized from benzene methanol) melted at 195–197°; $[\alpha]_D^{27}$ —37.8 (chloroform).

EXAMPLE 3

*Preparation of the ketal of 17α-hydroxypregnenolone*

A solution of 600 mg. of the ketal of Example 2 in 40 ml. dry ether—10 ml. benzene was added dropwise with stirring to a suspension of 300 mg. of lithium aluminum hydride in 50 ml. of dry ether. The mixture was stirred for two hours, the last hour while warming gently on a steam bath. It was then decomposed with water and extracted with ether. The solution was washed with water, dried and concentrated in vacuo after after the addition of a drop of pyridine. The remaining solid when crystallized from acetone gave white mealy crystals melting at 178–181°. By recrystallization from acetone, the pure ethylene glycol ketal of 17α-hydroxypregnenolone, M. P. 185–187°, was obtained $[\alpha]_D^{26}$ —44.8° (chloroform).

EXAMPLE 4

*The preparation of 17α-hydroxypregnenolone*

A 160-mg. sample of the ketal of the 17α-hydroxypregnenolone (Example 3) in 5 ml. methanol-1 ml. water containing 0.25 ml. sulfuric acid was refluxed for one and one-half hours. The mixture was chilled, the solid filtered, washed with water and dried. The solid was recrystallized several times from methanol. The isolated 17α-hydroxypregnenolone, fine prisms, melted at 265° $[\alpha]_D^{28}$ —34.4° (2 parts ethanol—1 part dioxane). The acetate was prepared by reaction of the 17α-hydroxypregnenolone with acetic anhydride in pyridine; white needles (from benzene-petroleum ether) melting at 232–234°.

EXAMPLE 5

*The preparation of the ketal of 16,17-oxido-allopregnane-3β-ol-20-one acetate*

A mixture of 1.32 g. of 16,17-oxido-allopregnane-3β-ol-20-one acetate and 1.31 g. of ethylene glycol in 50 ml. of benzene containing 50 mg. of p-toluenesulfonic acid monohydrate was refluxed in a flask connected to a Bidwell-Sterling moisture separator. After three hours the solution was diluted with ether, washed with water, dilute sodium carbonate solution, water and dried. The solvent was removed in vacuo and the residue was crystallized from acetone containing a few drops of pyridine. There resulted white, needle-like crystals of the ethylene glycol ketal of 16,17-oxido-allopregnane-3β-ol-20-one acetate, M. P. 188–192°. Treatment of the ketal of the 16,17-oxido compound with lithium aluminum hydride and working up as in Example 3 yields the cyclic ketal of allopregnane-3β, 17α-diol-20-one, which upon acid hydrolysis is converted to the 17α-hydroxy-allopregnanolone.

EXAMPLE 6

*Alternative preparation of 17α-hydroxypregnenolone*

The Δ⁵-16,17-oxido-pregnene-3β-ol-20-one acetate of Example 1 was hydrolyzed with methanolic potassium hydroxide to form the 3-hydroxy compound, which after several recrystallizations from ether-petroleum ether and from acetone melted at 189–190° C. This compound was then reacted with ethylene glycol as in Example 2 to form the ketal. The ketal of the 16,17-oxido-5-pregnene-3β-ol-20-one was then reduced with lithium aluminum hydride, and after working up the reaction product gave the same 17α-hydroxypregnenolone of Example 4.

EXAMPLE 7

*The preparation of 17α-hydroxy progesterone*

A 500-mg. sample of 16,17-oxido-5-pregnene-3β-ol-20-one was dissolved in 35 ml. of toluene and 5 ml. of freshly distilled cyclohexanone, and a few ml. of solvent distilled to eliminate traces of water. After the addition of another 10 ml. of toluene, 250 mg. of aluminum isopropoxide in 2.5 ml. of toluene was added dropwise to the refluxing solution. After one-half hour of refluxing, the mixture was decomposed with several drops of glacial acetic acid in 1 ml. of toluene. The mixture was then steam distilled, 4 grams of sodium chloride added, and after chilling the fine crystalline solid was separated. Crystallization of this material from ether-petroleum ether gave 330 mg. of product melting at 195–205° C. Purification by recrystallization from aqueous methanol gave pure 16,17-oxido-progesterone, M. P. 205–207°; $[\alpha]_D^{27}$ +160.8°. The oxido-progesterone, upon treatment with ethylene glycol in the presence of paratoluene sulfonic acid, gives the di-ketal. The di-ketal, upon reduction with lithium aluminum hydride and hydrolysis, yields 17α-hydroxy progesterone of melting point 213–215° C.;

$$[\alpha]_D^{22} = +97 \pm 2° \text{ (in chloroform)}.$$

It will be apparent that the Oppenauer oxidation may be carried out employing other ketones and catalysts. By "Oppenauer oxidation" is meant the conversion of a hydroxy group to a keto group by treatment of the steroid with aluminum alkoxide in the presence of an excess of ketone.

It will be readily seen from the foregoing examples that a means has been provided for protection of the 20-keto group during the reduction, as well as during oxidation of the 3-hydroxy groups to a keto group. The invention, moreover, is not limited to the particular compounds enumerated, but is applicable to the treatment of other 16,17-oxido-20-keto compounds. Where such compounds contain additional keto groups, these may also be converted to cyclic ketal groups, but upon hydrolysis to restore the 20-keto group such other keto groups will likewise be restored. Compounds containing —OH groups in positions other than the 3-position may also be treated.

Also other aryl sulfonic acid catalysts than paratoluene sulfonic acid may be used. Any other suitable method for making the cyclic ketal may be used, however. Other glycols than ethylene glycol may also be employed. Thus, propylene glycol, trimethylene glycol, and the like, may be used, but preferably the hydroxyl groups should be 1,2 or 1,3 to each other.

Attention is directed to application Serial No. 93,638, filed May 16, 1949, relation to the reduction of 16,17-oxido-20-keto steroids with lithium aluminum hydride; and application Serial No. 108,657, filed August 4, 1949, to the oxidation of the 3-hydroxy group of 3,17α-dihydroxy-20-acetals described herein.

Having described the invention, what is claimed is:

1. The process which comprises treating a C-20 cyclic lower alkylene ketal of a 16,17-oxido-20-keto steroid of the $C_{21}$ series, the nucleus of which is a cyclopentano-10,13-dimethylpolyhydrophenanthrene radical with lithium aluminum hydride.

2. The process which comprises treating a C-20 cyclic lower alkylene ketal of a 16,17-oxido-20-keto pregnane with lithium aluminum hydride.

3. The process which comprises treating a C-20 cyclic lower alkylene ketal of a 16,17-oxido-20-keto pregnene with lithium aluminum hydride.

4. The process which comprises reacting a 16,17-oxido-20-keto steroid, the nucleus of which is a cyclopentano - 10,13 - dimethylpolyhydrophenanthrene radical, with a polyhydric alcohol, two of the hydroxy groups of which are not farther apart than 1,3 to each other to form a 20-cyclic lower alkylene ketal, and treating the resulting ketal with lithium aluminum hydride.

5. The process of claim 4 in which the steroid is saturated.

6. The process of claim 4 in which the nucleus of the steroid is unsaturated.

7. The process which comprises treating the C-20 ethylene ketal of a 16,17-oxido-20-keto steroid of the $C_{21}$ series, the nucleus of which is a cyclopentano - 10,13 - dimethylpolyhydrophenanthrene radical with lithium aluminum hydride.

8. The process which comprises reacting a 16,17-oxido-20-keto steroid of the $C_{21}$ series, the nucleus of which is a cyclopentano-10,13-dimethylpolyhydrophenanthrene radical with ethylene glycol to form a cyclic ketal, and reacting the cyclic ketal with lithium aluminum hydride.

9. The process which comprises reacting a 16,17-oxido-20-keto steroid, the nucleus of which is a cyclopentano - 10,13 - dimethylpolyhydrophenanthrene radical, with a polyhydric alcohol, two of the hydroxy groups of which are not farther apart than 1,3 to each other to form a 20-cyclic lower alkylene ketal, and treating the resulting ketal with lithium aluminum hydride, and then hydrolyzing to restore the 20-keto group.

10. The process which comprises reacting 16,17-oxido-5-pregnene-3β-ol-20-one acetate with ethylene glycol to form a cyclic ethylene ketal, treating the cyclic ketal with lithium aluminum hydride, and then hydrolyzing to restore the 20-keto group.

11. The 20-cyclic lower alkylene ketals of 16,17-oxido-20-keto steroid of the $C_{21}$ series, the nucleus of which is a cyclopentano-10,13-dimethylpolyhydrophenanthrene radical.

12. The 20-cyclic lower alkylene ketals of 16,17-oxido-20-keto pregnenes.

13. The 20-cyclic lower alkylene ketals of 17α-hydroxy-20-keto steroid of the $C_{21}$ series, the nucleus of which is a cyclopentano-10,13-dimethylpolyhydrophenanthrene radical.

14. The 20-cyclic lower alkylene ketals of 17α-hydroxy-20-keto pregnanes.

15. The 20-cyclic lower alkylene ketals of 17α-hydroxy-20-keto pregnenes.

16. The 20-cyclic ethylene ketal of 5-pregnene-3β,17α-diol-20-one.

17. The 20-cyclic ethylene ketal of 16,17-oxido-5-pregnene-3β-ol-20-one acetate.

18. The process which comprises treating a C-20 cyclic ketal of a 16,17-oxido-20-keto steroid of the $C_{21}$ series, the nucleus of which is a cyclopentano -10,13- dimethylpolyhydrophenanthrene radical in which the ring of the cyclic ketal structure contains more than 2 and less than 5 carbon atoms with lithium aluminum hydride.

19. Compounds of the cyclopentano-10,13-dimethylpolyhydrophenanthrene series possessing in the 17β-position a substituent of the formula $$CH_3$$
$$C=X$$

where

$$C=X$$

represents a cyclic ketal structure possessing more than 2 and less than 5 total carbon atoms in the ketal ring, and also possessing an oxygen containing function attached to the 17-carbon atom in the alpha position by a single bond through the oxygen thereof, said compounds being further characterized in that the sum of the atomic weights of the atoms of said 17α-oxygen-containing substituent and the substituents on the 16-carbon atom does not exceed the sum of the atomic weights of one oxygen and three hydrogen atoms, said 16 and 17α-substituents being composed solely of hydrogen and oxygen.

20. The 20-cyclic lower alkylene ketals of 16,17-oxido-allopregnane-3β-ol-20-one 3-acetate.

21. The compounds of claim 20 in which the lower alkylene group is an ethylene group.

22. The 20-cyclic lower alkylene ketals of allopregnane-3β,17α-diol-20-one.

23. The compounds of claim 22 in which the lower alkylene group is an ethylene group.

PERCY L. JULIAN.
EDWIN W. MEYER.
ISABELLE RYDEN.

References Cited in the file of this patent

UNITED STATES PATENTS

| Number | Name | Date |
|---|---|---|
| 2,288,854 | Stavely | July 7, 1942 |
| 2,294,433 | Westphal | Sept. 1, 1942 |
| 2,302,636 | Koster et al. | Nov. 17, 1942 |
| 2,312,482 | Reichstein | Mar. 2, 1943 |

FOREIGN PATENTS

| Number | Country | Date |
|---|---|---|
| 876,816 | France | Nov. 18, 1942 |

OTHER REFERENCES

Plattner Helv. Chim. Acta 31, 2210–2214 (1948).